H. E. GOLDBERG (NOW BY JUDICIAL CHANGE OF NAME H. GOLBER).
ALGEBRAIC TOTAL CALCULATING MACHINE.
APPLICATION FILED AUG. 26, 1913. RENEWED SEPT. 24, 1921.

1,398,074.

Patented Nov. 22, 1921.
4 SHEETS—SHEET 2.

H. E. GOLDBERG (NOW BY JUDICIAL CHANGE OF NAME H. GOLBER).
ALGEBRAIC TOTAL CALCULATING MACHINE.
APPLICATION FILED AUG. 26, 1913. RENEWED SEPT. 24, 1921.

1,398,074.

Patented Nov. 22, 1921.

H. E. GOLDBERG (NOW BY JUDICIAL CHANGE OF NAME H. GOLBER)
ALGEBRAIC TOTAL CALCULATING MACHINE.
APPLICATION FILED AUG. 26, 1913. RENEWED SEPT. 24, 1921.

1,398,074.

Patented Nov. 22, 1921.

UNITED STATES PATENT OFFICE.

HYMAN ELI GOLDBERG (NOW BY JUDICIAL CHANGE OF NAME HYMAN GOLBER), OF CHICAGO, ILLINOIS, ASSIGNOR, BY MESNE ASSIGNMENTS, TO REMINGTON ACCOUNTING MACHINE CORPORATION, OF NEW YORK, N. Y., A CORPORATION OF NEW YORK.

ALGEBRAIC-TOTAL CALCULATING-MACHINE.

1,398,074.   Specification of Letters Patent.   Patented Nov. 22, 1921.

Application filed August 26, 1913, Serial No. 786,705. Renewed September 24, 1921. Serial No. 503,073.

*To all whom it may concern:*

Be it known that I, HYMAN ELI GOLDBERG, a citizen of the United States, residing at Chicago, in the county of Cook and State of Illinois, have invented certain new and useful Improvements in Algebraic-Total Calculating-Machines, of which the following is a specification.

My invention is a machine by means of which the total of a series of additions and subtractions is obtained in its true form whether said total be positive or negative.

More specifically, my invention is a mechanism by means of which the algebraic total can be obtained on calculating machines provided with a totalizer and a master wheel which moves relatively thereto.

More specifically, my invention is an algebraic-total mechanism particularly adapted to typewriter attachments like the Wahl now on the market, which Wahl machine is described in Patent No. 893,719, issued July 21, 1908.

Still more specifically, my invention is an algebraic-total mechanism in which the total is automatically corrected on the insertion of the last digit of a number which causes the total to pass through zero. In my present invention, the correction is not made until the last digit of a number causing the totalizer to pass through zero is inserted.

The main object of my invention is to construct a machine accomplishing the results above stated.

Referring to the additional parts necessary to transform a non-algebraic totalizer into an algebraic totalizer: another object of my invention is to transfer as many of said parts as possible from the totalizer proper into the actuator therefor. The purpose of this is to eliminate as largely as possible the necessity of duplicating parts in the use of this machine with a plurality of totalizers.

It might therefore be said that an object of my invention is to make an algebraic-total calculating machine provided with a plurality of independent totalizers. Each of these totalizers shall be able to calculate an algebraic total. These totalizers shall be provided with a minimum of extra parts necessitated by the algebraic character of the total.

The main algebraic mechanism is to be located on the operating mechanism for the totalizers. Thus there will be only one main algebraic mechanism, which will transform a whole set of ordinary totalizers into algebraic totalizers.

Another object of my invention is to construct an algebraic-totalizer mechanism which shall be simple in construction and accurate in its operation.

The mechanism is illustrated by the accompanying drawings, of which,—

It is well known in the theory of algebraic totalizers that a non-algebraic totalizer may be converted into an algebraic totalizer (1) by providing its carrying wheels with two sets of numerals, one set running from 0 to 9, and the other set running from 9 to 0, the pairing being 0-9, 1-8, etc.; and (2) by inserting an extra unit in the lowest place of the totalizer whenever the highest place of said totalizer passes through zero. The inserting of this extra unit in the lowest place is in the same direction as the inserting of the number which causes the highest wheel to cross the zero point.

The inserting of this extra unit may be accomplished in a variety of ways. One method of inserting this extra unit is shown in my co-pending application Serial No. 785,670, filed August 20, 1913, in which case, while the extra unit is inserted simultaneously with the passage of the highest wheel through zero, practically all the mechanism for accomplishing this result is located in the actuating mechanism, and little of the algebraic mechanism is located in the totalizer. As before stated, in the machine described in this present application, in case of the passage of the totalizer through zero, I defer the inserting of the extra unit until the inserting of the last digit of the number causing the totalizer to pass through zero. Practically all of the mechanism necessary for the inserting of this extra unit is located in the actuator, as in the case of my co-pending application Serial No. 785,670, filed August 20, 1913, above referred to. For instance, if the totalizer read 000 062 000 and the number 473 982 were subtracted therefrom, the correct result would be minus 411 982. Now the highest wheel of the totalizer will change when the 4 is inserted, and as will be afterward explained, the shutter associated with the totalizer will simultaneously shift to exhibit the negative number disks; but the extra unit necessary to correct the number shown by these number disks will not be inserted until the last digit of the subtracted number, viz. 2, is entered into the totalizer. Consequently when the numeral key 2 is actuated there will be put into the totalizer not 2, as is usual upon the actuation of this key, but 3.

The general construction of the machine is the same as the Wahl machine now on the market, and described in the above cited Patent No. 893,719. It will therefore not be necessary to give a complete description of the machine, and only such parts will be described as are necessary to the understanding of the new invention.

It is, of course, understood that the calculating machine is mounted upon a typewriter, preferably the Remington typewriter now on the market, to whose frame the actuating portion of the calculating machine is fastened. It operates in conjunction with the carriage of the typewriter to whose frame the totalizer bar of the calculating attachment is fastened. It is also operated by the numeral keys of the typewriter, to which numeral keys are fastened links operating the digiting mechanism of the attachment.

In the drawings: 1 indicates stationary framework. It is immaterial whether this framework is a portion of the typewriter proper or of the calculating attachment fastened thereto. 2 indicates the totalizer bar of the attachment. 3 indicates a set of links, one of which is fastened to each of the numeral keys of the typewriter.

The links are fastened to fan-shaped pieces 4 which coöperate with goose-necks 5. There is a sector shaft 6 mounted in the framework and provided with a set of arms 7, one for each goose-neck. The depressing of a numeral key and consequent reciprocating of the goose-neck causes the sector-shaft to be displaced a distance dependent on the value of the numeral key then operating. The sector-shaft is provided with a sector 8 pivotally mounted thereon, which sector is provided with gear-teeth 9 which mesh and unmesh with either the direct gear 10 or the reverse gear 11. The direct gear 10 is splined to its shaft 12, to which is rigidly fastened the master gear 13. The fan-shaped pieces 4 are provided with rises 14 which operate a roller-shaft 15 swinging as a bail about a rock-shaft 16. The rock-shaft is provided with a helical cam 17 which reciprocates a sliding plate 18 which grasps the sector 8. There is also a locking pawl 19, which serves to lock and unlock the master wheel. This locking pawl is operated by the rock-shaft.

The above parts are all old, and are thoroughly described in the above cited patent, No. 893,719, where any further explanation desired may be found.

Figure 1:
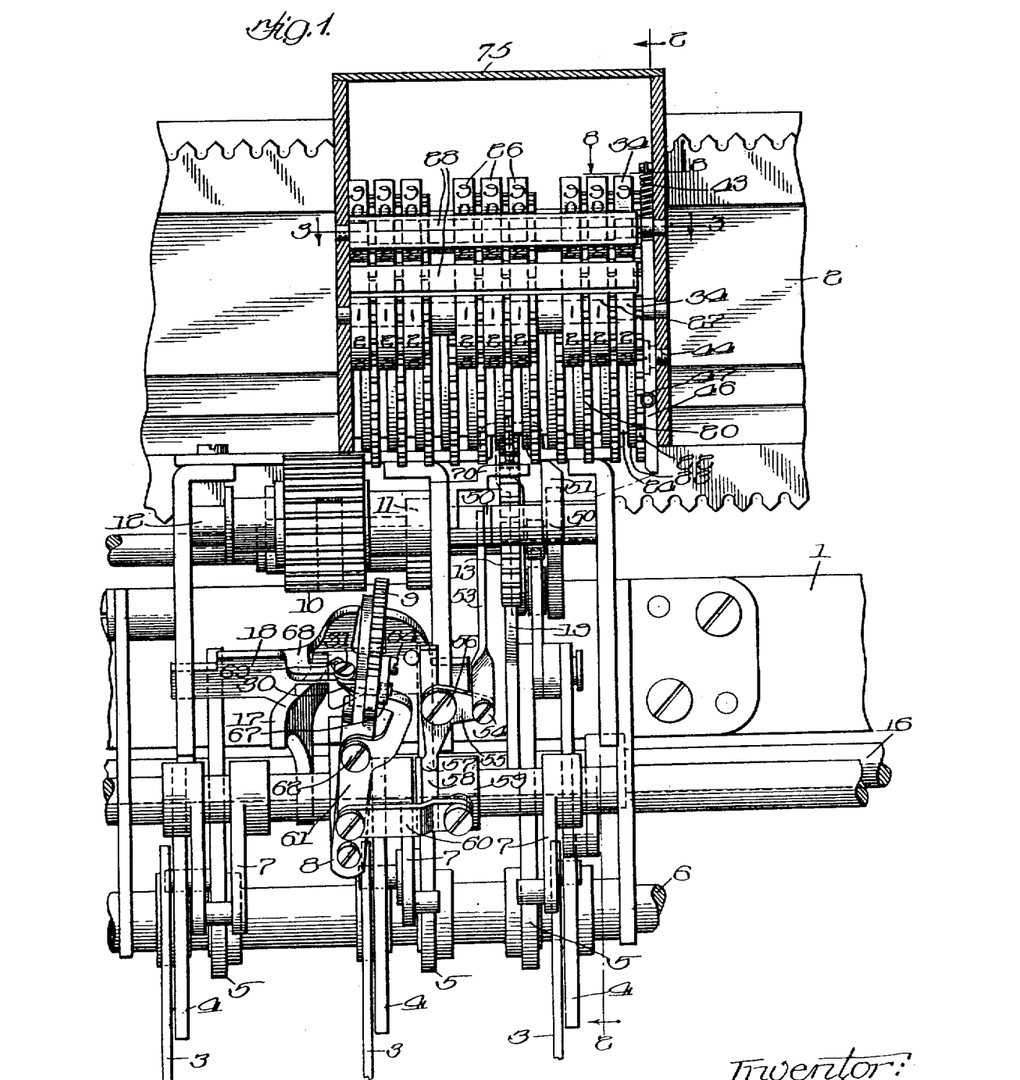
Figure 1 represents a portion of a totalizer and an actuator therefor drawn in elevation, the covers being removed and all the parts being shown.

The timing of the movements of the parts is as follows: Normally: the sector is as shown in Fig. 1; that is, it is out of mesh with the direct gear by being inclined to the right; the master wheel is locked by its pawl. During the stroke of the key (1), the rock-shaft and helical cam are moved and the sector is placed perpendicular to the sector-shaft and also in engagement with its mating gear, in this case the direct gear. Then (2) the locking pawl unlocks the master wheel. These preliminary initial operations caused by the rock-shaft being over, (3) the sector-shaft is displaced from its normal zero position a distance dependent on the value of the driving numeral key and comes to rest. The sector, direct gear and master wheel, thus also come to rest. Then follows a final set of operations again caused by the rock-shaft, namely, (4) the master wheel becomes locked, and then (5) the sector is again displaced to the right, and thus gets out of mesh with its mating gear. All the above movements take place during the stroke of the driving numeral key. On the re-stroke of said key, (6) the sector returns from its displaced position into its normal position, but does not engage its mating wheel. Neither does the master wheel become unlocked during said re-stroke.

The return of the sector-shaft from its displaced to its normal position is brought about through a spring. It is therefore not positive. The return of the sector from its meshing perpendicular position to its unmeshed inclined, position is also brought about through a spring. The bringing of the sector into mesh is, however, brought about positively by the force applied by the operator to the numeral key of the typewriter.

Figures 2, 3, 9:
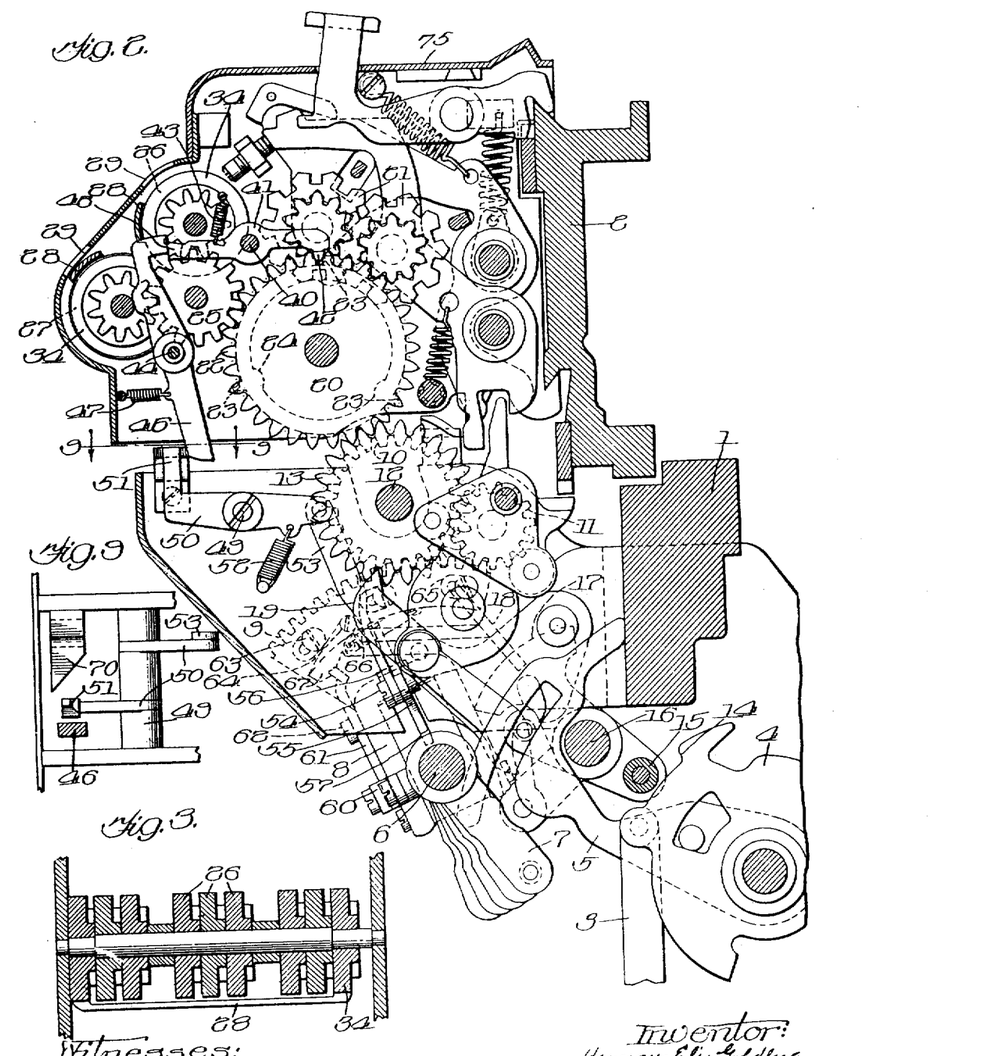
Fig. 2 represents a view of the same mechanism as shown in Fig. 1, along the section line 2—2 of Fig. 1.
Fig. 3 is a detail showing the attachment of one of the shutters, this view being taken along the section line 3—3 of Fig. 1.
Fig. 9 is a view along section line 9—9 of Fig. 2, showing detail of the restoring cam.

The master wheel 13 serves to drive the carrying wheels 20 of the totalizer 75. These carrying wheels coöperate with carryable wheels 21, which serve to carry the tens from a lower carrying wheel into the next higher one. For the purposes of convenience (to get room), the single set of carryable wheels has been arranged in two series, as shown in Fig. 2. As is well known, the carrying wheels are each provided with a thirty-toothed gear 22, by means of which it may be driven, a three-toothed mutilated gear 23, and a three-scalloped disk 24. The three-toothed gear 23 serves to carry the tens, and the three-scalloped disk serves to prevent overthrow.

The mechanism of the totalizer so far described is also old, and also to be found in the cited patent. I shall now enter upon the description of the new mechanism.

Meshing with each carrying gear 20 is an idle gear 25. Meshing with each idle gear are two numeral wheels 26 and 27. Both numeral wheels are provided with numerals running from 0 to 9, inclusive, but the numerals on one wheel run in the reverse direction from those upon the other. Fastened to the highest numeral wheel of each of the sets is a shutter 28. As seen in Fig. 2, the shutters are so placed that when one is uncovering the numerals at its sight slot 29 in the cover of the totalizer, the other shutter is in alinement with its sight slot, and thus prevents the seeing of the numerals underneath.

The shutters 28 extending from the numeral wheels of the highest order reach one step to the right of the units numeral wheel. There the shutters are fastened to a special disk 34, which might be considered as a blind numeral wheel. Meshing with said special disk 34 is also a special idle gear 25 and a special carrying wheel 20. Any rotation given to the highest numeral wheel or carrying wheel is thus reverted into the special mechanism provided in the sub-units place.

Figure 8:
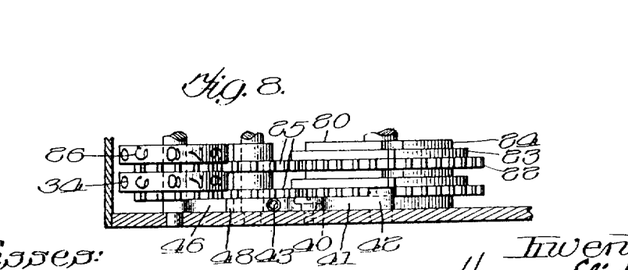
Fig. 8 is a partial view along the section line 8—8 of Fig. 1, showing details of certain totalizer parts to be referred to hereinafter.

Pivoted at 40 on the framework of the totalizer is a latch 41 (Figs. 2 and 8) having a nose 42 which engages the teeth of the carrying wheel 20 in the sub-units place. A spring 43 tends to hold this nose in engagement with the teeth. Pivoted at 44 on the same totalizer framework is a trigger 46 having attached to it a tension spring 47, which normally tends to rotate the trigger 46 in a clockwise direction (Fig. 2). This rotation is prevented by the left end 48 of the latch 41.

Bearing in mind that through the reverted chain previously described the carrying wheel 20 in the sub-units place rotates one space, either clockwise or in the contrary direction, whenever the highest wheel of the totalizer passes through zero, it will be readily seen that such passage of the highest wheel will result in the unlatching of the trigger 46 from its position as shown in Fig. 2, and its movement under tension of the spring 47 into a position where it will engage actuator mechanism now to be described.

Pivoted in the actuator framework at 49 is a lever 50 having an upwardly projecting portion 51 adapted to engage with the trigger 46 when the latter is displaced from its normal position. A tension spring 52 tends to rotate the lever 50 in a clockwise direction. A link 53 pivoted at 54 on the lever 50 serves to connect this lever with a bell crank lever 55 pivoted at 56 on the framework. The bell crank 55 has a nose 57 which engages a slot 58 in a collar 59 which is so constructed as to rotate with and slide on the sector shaft 6. The collar 59 is connected by a link 60 pivotally mounted thereon to a lever 61 pivoted on the sector 8 at 62. Attention is now called to the fact that rotation in a counter-clockwise direction of the lever 50 will result in rotation in a clockwise direction of the lever 61 about its pivot 62.

In the Wahl Patent No. 893,719, before referred to, the sector corresponding to the sector 8 in this present application has its gear teeth mounted solidly thereon. However, in this present application, the teeth of the sector are not solid with the sector itself, but slidably mounted thereon, as shown in Figs. 4, 5, 6 and 7. A series of stud screws 63 are mounted in the sector 8, and the gear segment 9 has slots 65 therein which engage the said stud screws.

Figures 4, 5:
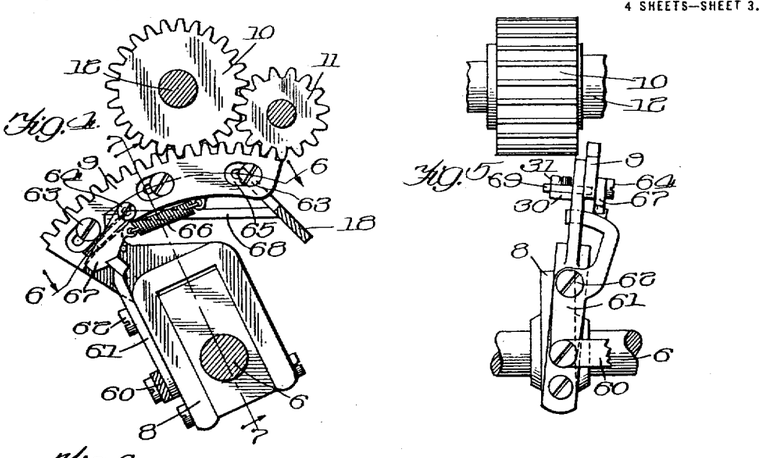
Figs. 4, 5, 6 and 7 are details of the actuating sector and mechanism associated therewith, the views being taken along the like numbered section lines.

Referring particularly to Fig. 4, it will be seen that a spring 66 having one end fastened in the spring segment 64 and the other in the sector 8, tends to displace the segment 64 relative to the sector 8. This displacement is prevented by the engagement of a latch 67 pivoted on the gear segment 9 at 64 with the lever 61. Consequently, in case of this lever being withdrawn from the latch 67, the spring will draw the segment 64 to the right (Fig. 4) until the stud screws 63 engage the other end of their coöperating slots, and these slots are made of sufficient length that the above-mentioned displacement will correspond to a space of one tooth. This sector mechanism will be recognized as substantially the same as that shown in my co-pending application Serial No. 785,670, filed Aug. 20, 1913.

Figure 6:
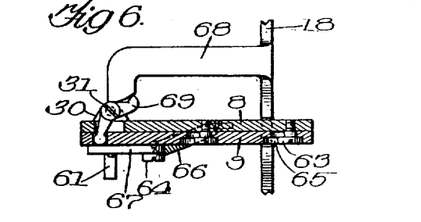
Figure 7:
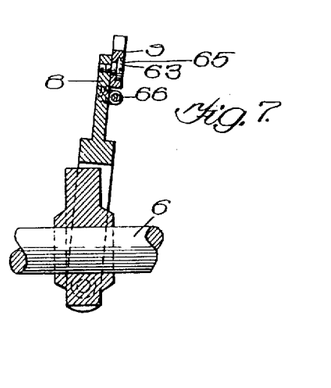

Referring particularly to Figs. 1, 5 and 6, it will be seen that the gear sector 8 has formed on it a right-angled projection 30 to which is pivoted at 31 a small restoring lever 69. Upon the sliding plate 18 is formed an extension 68 having a cam surface coöperating with the restoring lever 69, (best shown in Fig. 6.) As long as the sector is in the position shown in Fig. 6, the gear segment 9 is prevented from moving under the influence of the spring 66 by the engagement of the restoring lever 69 with the cam surface of the extension 68, even though the cam surface or lever 61 is withdrawn from the lever 67. Inspection of these parts, as shown in Fig. 1, discloses that the sector 8 is normally in a tilted position and that the restoring lever 69 is nearer to the center of motion of the sector than the slot in the sliding plate 18 in which the sector itself turns. Consequently when the sliding plate 18 is moved to the left, as is the case during the inserting of every number, the extension 68 will move out of the path of the restoring lever 69, and the latter will be free to move if the lever 61 has been previously released.

We are now in a position to describe the combined operation of totalizer and actuator. Whenever a number is being inserted in the totalizer, such number will either cause the totalizer to pass through zero or it will not. In the latter case, the algebraic mechanism described in this application is not brought into use; consequently this case need not be considered. However, if the inserted number causes the totalizer to pass through zero, the trigger 46 will be tripped on the inserting of the digit causing the totalizer to pass through zero. As before mentioned, the number then exhibited by the totalizer will be one unit wrong; but the lever 50 is so positioned in respect to the trigger 46 that when the totalizer moves to the position where the wheel 20 in the units decimal place is engaged by the master wheel 13, the trigger 46 will engage the lever 50 and rotate it slightly in a counter-clockwise direction. This motion of the lever 50 will be communicated by the link 53, collar 59 and link 60 to the lever 61, which will be rotated on the sector 8 in a clockwise direction, thereby unlatching the latch 67 which has been resisting the attempt of the spring 66 to move the gear segment 64 relative to the sector 8. The gear segment 64 will not move immediately, since it is prevented from so doing by the action of the extension 68 of the sliding plate 18 on the restoring lever 69 (best shown in Fig. 6). However, as soon as a digit key is pressed the sliding plate 18 is moved to the left (Fig. 1), thereby separating the extension 68 and restoring lever 69. The gear segment 9 is engaged with either the direct gear 10 or the reverse gear 11 before any motion due to the spring 66 can occur. Consequently such motion, if there be any, is communicated to the master wheel, and through the master wheel to the carrying wheel 20 in the units space of the totalizer. This wheel is at that time engaged with the master wheel. It is to be noted that this extra motion will always be inserted in the totalizer in the same direction as the number causing the totalizer to pass through zero, for whether the gear segment 9 shall engage with the direct gear 10 or the reverse gear 11 has been determined by the operator prior to the inserting of a number.

I will now describe the mechanism by which the parts are restored to their normal position subsequent to the above described actions taking place.

As the totalizer moves on to the left subsequent to the inserting of a number, the trigger 46 encounters a cam 70 which is rigidly mounted on the framework. As best shown in Fig. 9, further motion of the totalizer to the left will result in the resetting of this trigger to its normal position. The spring 52 will, of course, reset the lever 50 and its associated parts, including the lever 61, as soon as the trigger 46 disengages from the lever 50. There remains but the gear segment 9 to be reset, and this is accomplished by the action of the cam surface 68 on the resetting lever 69 as the sector snaps back into its normal position.

Figure 10:
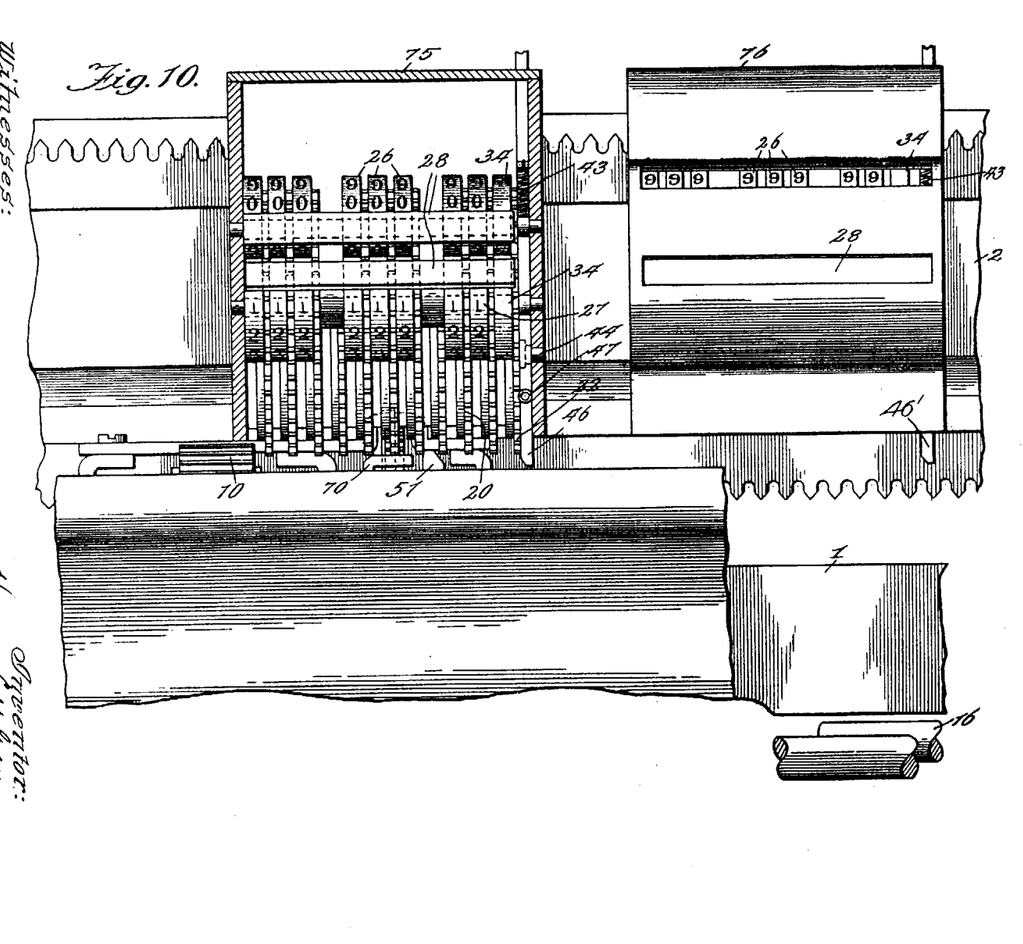
Fig. 10 is a front view of the truck of the machine, showing a plurality of totalizers.

In Fig. 10 I have shown two totalizers 75 and 76 mounted on the bar 2. These totalizers are precisely alike, the trigger 46' of the totalizer 76 being in position and function like the trigger 46 of the totalizer 75. It is obvious that these totalizers would in turn coöperate with the mechanism in the actuator for the inserting of an extra unit. It will also be noted that the mechanism peculiar to the indicating of an algebraic total which is located in the totalizer itself consists of, in addition to the customary extra number wheels and the shutters, only the trigger 46 and latch 41. Consequently these algebraic totalizers themselves are comparatively simple.

It is also to be noted that this algebraic mechanism in the actuator will not interfere in any manner with the operation of a totalizer which does not have the algebraic mechanism, since in the latter case the trigger 46 is absent. Consequently the lever 50 is never disturbed and the actuator functions as if the gear segment 9 were rigid with the sector 8.

While I have shown two sets of number wheels having the numbers running in opposite directions in this application the use of the two sets of wheels is from considerations of space only. An obvious equivalent would be the use of one set of number wheels and having the two sets of numbers on the same wheels.

Many changes and modifications may be made in the above-described structure without departing from the spirit of my invention, since I claim:

1. In a calculating machine, the combination of: a plurality of carrying wheels; and means operating upon the carrying wheels successively and adapted to give to the engaged carrying wheel a movement controlled by two distinct sources, namely, digiting mechanism and the highest carrying wheel of said plurality, said motion controlled by the highest carrying wheel of said plurality being given only when said traveling means is in engagement with a certain one of said carrying wheels.

2. In a calculating machine, the combination of: a plurality of carrying wheels; a master wheel operating upon the carrying wheels successively; digitizing mechanism adapted to operate said master wheel; and mechanism operated by the joint action of the highest carrying wheel and the lateral motion of the master wheel relative to said carrying wheels for imparting to said master wheel an added unit of movement.

3. In a calculating machine, the combination of: a plurality of carrying wheels; a master wheel operating upon the carrying wheels successively; digitizing mechanism adapted to operate said master wheel; and mechanism operated by the joint action of the highest carrying wheel and the lateral motion of the master wheel relative to said carrying wheels for imparting to said master wheel an added unit of movement when said master wheel is engaged with the lowest wheel of said carrying wheels.

4. In a calculating machine, the combination of: a plurality of totalizers; and algebraic-total mechanism therefor, said algebraic-total mechanism being composed of two parts, the first of said parts being duplicated for each of said totalizers and being located at a constant distance from said totalizer, the other part not being duplicated for each of said totalizers and traveling from totalizer to totalizer and being brought into action only when any of said totalizers occupy a certain position relative to said traveling algebraic-total mechanism.

5. In a calculating machine, the combination of: a plurality of carrying wheels; actuating means adapted to engage said carrying wheels *seriatim;* means for giving said actuating means an added unit of movement as an incident of the passage of the highest carrying wheel through zero, said added unit of movement being given only when said carrying wheels are in a certain position relative to said actuating means.

6. In a calculating machine, the combination of: a plurality of carrying wheels, a master wheel adapted to engage said carrying wheels *seriatim;* means for giving said master wheel an added unit of movement as an incident of the passage of the highest carrying wheel through zero, said added unit of movement being given only when said carrying wheels are in a certain position relative to said master wheel.

7. In a calculating machine, the combination of: a moving carriage; a plurality of totalizers mounted thereon, each totalizer embodying a plurality of carrying wheels and tens carrying mechanisms; a master wheel adapted to engage said carrying wheels *seriatim;* and means brought into action when said master wheel engages the lowest carrying wheel of any of said totalizers for giving said master wheel an added unit of movement as an incident of the passage of the highest wheel of any of said totalizers through zero.

8. In a calculating machine, the combination of: a moving carriage; a totalizer mounted thereon, said totalizer embodying a plurality of carrying wheels, tens carrying mechanism, numeral wheels bearing two sets of numbers, and designating means for said sets; a master wheel adapted to engage said carrying wheels *seriatim;* and means brought into action when said master wheel engages the lowest carrying wheel of any of said totalizers for giving said master wheel an added unit of movement as an incident of the passage of the highest wheel of any of said totalizers through zero whereby the correct algebraic total is exhibited in the number set identified by said designating means.

9. In a calculating machine, the combination of: a set of numeral keys; a master wheel; a totalizer traveling relatively thereto; differential mechanism connecting said keys and master wheel; and means brought into operation independently of said keys when said totalizer occupies a certain position relative to said master wheel for giving said master wheel an added unit of movement.

10. In a calculating machine, the combination of: a set of numeral keys; a master wheel; differential mechanism connecting said keys and master wheel; a totalizer having a plurality of carrying wheels adapted to be engaged by said master wheel *seriatim;* and means controlled by said totalizer and brought into action when said totalizer is in a certain position relative to said master wheel for giving said master wheel an added unit of motion.

11. In a calculating machine, the combination of: a set of numeral keys; a master wheel; differential mechanism connecting said keys and master wheel; a totalizer having a plurality of carrying wheels adapted to be engaged by said master wheel *seriatim;* and means controlled by said totalizer and brought into action when said master wheel is engaged with the lowest wheel of said totalizer for giving said master wheel an added unit of motion.

12. In a calculating machine, the combination of: a set of numeral keys; a master wheel; differential mechanism connecting said keys and master wheel; a plurality of totalizers each having a plurality of carrying wheels adapted to be engaged by said master wheel *seriatim;* and means controlled by any of said totalizers and brought into action when said master wheel engages the lowest wheel of any of said totalizers for giving said master wheel an added unit of motion.

13. In a calculating machine, the combination of: a frame; a decimal carriage mounted thereon; a series of carrying wheels adapted to have a zero position and indicate both positive and negative numbers by their displacement; and two coöperating pieces adapted to be brought into contact with the travel of said decimal carriage, one of said pieces having a normal and a displaced position, and one of said positions being determined by the passage of the highest of said carrying wheels through zero.

14. In a calculating machine, the combination of: a framing; a totalizer movably mounted thereon, said totalizer having a series of carrying wheels adapted to have a zero position and indicate both positive and negative numbers by their displacement; and two coöperating pieces adapted to be brought into contact by the travel of said totalizer, one of said pieces being mounted on said totalizer and having a normal and a displaced position, said displaced position being determined by the passage of the highest wheel of said totalizer through zero.

15. In a calculating machine, the combination of: a framing; a totalizer mounted thereon; a latch and a trigger mounted on said totalizer, said latch being adapted to be tripped by said trigger coincident with the passage of said totalizer through zero.

16. In a calculating machine, the combination of a set of numeral keys, a master wheel, differential mechanism connecting said keys and master wheel, a gear reversing device to determine the direction of rotation of said master wheel, a totalizer having a plurality of carrying wheels adapted to be engaged by said master wheel *seriatim* and means controlled by said totalizer and brought into action when said totalizer is in a certain position relative to said master wheel for giving said master wheel an added unit of motion in a direction determined by the position of said gear reversing device.

17. In a calculating machine, the combination of a set of numeral keys, a master wheel, differential mechanism connecting said keys and master wheel, a gear reversing device to determine the direction of rotation of said master wheel, a totalizer having a plurality of carrying wheels adapted to be engaged by said master wheels *seriatim* and means independent of said numeral keys and controlled by said totalizer and brought into action when said totalizer is in a certain position relative to said master wheel for giving said master wheel an added unit of motion in a direction determined by the position of said gear reversing device.

18. In a calculating machine, the combination of a set of numeral keys, a master wheel, differential mechanism connecting said keys and master wheel, a gear reversing device to determine the direction of rotation of said master wheel, a totalizer having a plurality of carrying wheels adapted to be engaged by said master wheels *seriatim* and means controlled by the highest wheel of the totalizer and brought into action when said totalizer is in a certain position relative to said master wheel for giving said master wheel an added unit of motion in a direction determined by the position of said gear reversing device.

19. In a calculating machine, the combination of a set of numeral keys, a master wheel, differential mechanism connecting said keys and master wheel, a gear reversing device to determine the direction of rotation of said master wheel, a totalizer having a plurality of carrying wheels adapted to be engaged by said master wheels *seriatim* and means controlled by the highest wheel of the totalizer and brought into action when said totalizer is in a certain position relative to said master wheel for giving said master wheel an added unit of motion in a direction determined by the position of said gear reversing device.

20. In a calculating machine, the combination of a set of numeral keys, a master wheel, differential mechanism connecting said keys and master wheel, a traveling carriage, a plurality of totalizers mounted on said traveling carriage, the arrangement of said totalizers, numeral keys and master wheel being such that said master wheel is adapted to insert numbers in said totalizers *seriatim* upon the operation of said numeral keys, means to give the master wheel an added increment movement independent of the operation of said numeral keys, and means individual to each of said totalizers and controlled by the position of the highest wheels thereof for determining the operation of the last mentioned means.

21. In a calculating machine the combination of a differential mechanism, a plurality of carrying wheels and means operating on the carrying wheels successively and adapted to give to the engaged carrying wheel movement controlled by two distinct sources, namely, the differential mechanism and the highest carrying wheel of said plurality.

22. In a calculating machine, the combination of a plurality of carrying wheels, a master mechanism operating on the carrying wheels successively and engaging them *seriatim*, differential mechanism adapted to operate said master wheel and means operated by the carrying wheel next lower to the one engaged by the master wheel for imparting to said master wheel an added step of movement.

23. In a calculating machine, the combination of a plurality of totalizers; an algebraic-total mechanism therefor, said algebraic-total mechanism being composed of two parts, the first of said parts being duplicated for each of said totalizers and being fixed relative to each of said totalizers; the other part being movable in respect to said totalizers and traveling from totalizer to totalizer.

24. In a calculating machine the combination of a set of numeral keys, a master wheel; differential mechanism connecting said keys and master wheel and means brought into operation independently of said keys for giving said master wheel an added increment of movement.

25. In a calculating machine, the combination of a set of numeral keys, a master wheel, a differential mechanism connecting said keys and master wheel, a totalizer having a plurality of carrying wheels adapted to be engaged by said master wheel *seriatim* and means controlled by said totalizer for giving said master wheel an added increment of motion.

26. In a calculating machine, the combination of a set of numeral keys, a master wheel, differential mechanism connecting said keys and master wheel, a plurality of totalizers each having a plurality of carrying wheels adapted to be engaged by said master wheels *seriatim* and means controlled by any of said totalizers for giving said master wheel an added increment of motion.

27. In a machine of the class described, the combination with an accounting device comprising a plurality of totalizer elements of different denominations, of a driving mechanism therefor constructed to be given a variable movement and including a master actuator acting on said elements one after another and means whereby the accounting device controls the variable movement of said master actuator.

In witness whereof, I have hereunto signed my name, this 23rd day of August, 1913.

HYMAN ELI GOLDBERG.

Witnesses:
 JULIA M. BRISTOL,
 DAVID D. GOLDBERG.